(12) United States Patent
Li

(10) Patent No.: US 7,448,293 B2
(45) Date of Patent: Nov. 11, 2008

(54) CONTROL SYSTEM FOR DRIVING A MOTOR TO PERFORM A PLURALITY OF ACTIONS

(75) Inventor: Wen-Bing Li, Hengyang (CN)

(73) Assignee: Lite-On Technology Corporation, Taipei (TW)

( * ) Notice: Subject to any disclaimer, the term of this patent is extended or adjusted under 35 U.S.C. 154(b) by 378 days.

(21) Appl. No.: 11/477,930

(22) Filed: Jun. 30, 2006

(65) Prior Publication Data

US 2008/0000313 A1    Jan. 3, 2008

(51) Int. Cl.
*F16H 3/34* (2006.01)

(52) U.S. Cl. .............. 74/354; 74/353; 74/625; 74/640; 74/665 Q; 74/665 P; 74/731.1; 74/810.1

(58) Field of Classification Search ............. 74/353, 74/354, 640, 665 R, 665 A, 665 B, 665 C, 74/665 D, 665 E, 665 F, 665 GA, 665 H, 74/665 S, 665 Q, 665 P, 731.1, 810.1, 318, 74/319

See application file for complete search history.

(56) References Cited

U.S. PATENT DOCUMENTS

| | | | | |
|---|---|---|---|---|
| 5,226,743 A * | 7/1993 | Jackson et al. | ............... | 400/625 |
| 5,738,453 A * | 4/1998 | Tsuburaya et al. | .......... | 400/624 |
| 5,892,594 A * | 4/1999 | Yoo | .......................... | 358/498 |
| 5,954,326 A * | 9/1999 | Gaarder et al. | ............. | 271/9.02 |
| 6,672,581 B2 * | 1/2004 | Lee et al. | ..................... | 271/164 |

\* cited by examiner

*Primary Examiner*—David D. Le
(74) *Attorney, Agent, or Firm*—Rosenberg, Klein & Lee

(57) ABSTRACT

A control system for driving a motor to perform a plurality of actions, includes a motor gear set, a first action gear set, a second action gear set, a third action gear set, a first switch gear set, and a second switch gear set. The first and second switch gear sets are driven by different operation directions of the motor gear set. Moreover, the first, second, and third action gear sets are driven to perform the actions by different switch method of the first switch gear set, the second switch gear set, or a combination of the first and second switch gear sets.

19 Claims, 7 Drawing Sheets

CONTROL SYSTEM FOR DRIVING A MOTOR TO PERFORM A PLURALITY OF ACTIONS

BACKGROUND OF THE INVENTION

1. Field of the Invention

The present invention relates to a control system for driving a motor to perform a plurality of actions, and particularly relates to a motor for driving different switch gear sets to perform a plurality of actions via different rotation direction of the motor.

2. Description of the Related Art

Traditional motors drive a mechanism to produce only one movement, alternatively the mechanism can produce two movements via a clockwise rotation or an anticlockwise rotation of the motor, respectively. For example, a printer has a print head, a paper-catching mechanism, and a ribbon-rotating mechanism. Before the printer prints, the print head needs to be raised upwardly via a print motor, the paper-catching mechanism is driven to position a piece of paper in a print position via a paper-catching motor and the ribbon-rotating mechanism is driven to rotate a ribbon in a suitable position via a ribbon-rotating motor. Finally, the print head is pressed downwardly and the ribbon-rotating mechanism is rotated to print the document.

However, the competition in the printer market is keen, so that using three sets of motors and three mechanisms increases the manufacturing cost and size of the product. Hence, it is important to design a control system for performing a plurality of movements via a motor in order to decrease the manufacturing cost and size of the product.

SUMMARY OF THE INVENTION

The present invention provides a control system for driving a motor to perform a plurality of movements. Because the control system can drive the motor to perform the movements, the manufacturing cost and the size of the control system can be decreased.

A first aspect of the present invention is a control system for driving a motor to perform a plurality of actions, comprising: a motor gear set, a first switch gear set, a first action gear set, a second switch gear set, a second action gear set and a third action gear set. The motor gear set has a first operating mode and a second operating mode. The first switch gear set is matched with the motor gear set, wherein the first switch gear set produces a first switch mode and a second switch mode via the first operating mode and the second operating mode, respectively. The first action gear set is matched with the first switch gear set for rotation, wherein the first action gear set produces a raising mode and a downward pressing mode via the first operating mode of the motor gear set and the first switch mode of the first switch gear set, respectively.

Moreover, the second switch gear set is matched with the first switch gear set, wherein when the first action gear set is in the raising mode, the second switch gear set produces a three switch mode via the second switch mode of the first switch gear set, and when the first action gear set is in the downward pressing mode, the second switch gear set produces a four switch mode via the second switch mode of the first switch gear set. The second action gear set is matched with the second switch gear set, wherein the second action gear set produces a rotation mode via the third switch mode of the second switch gear set. The third action gear set is matched with the second switch gear set, wherein the third action gear set produces a rotation mode via the four switch mode of the second switch gear set.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
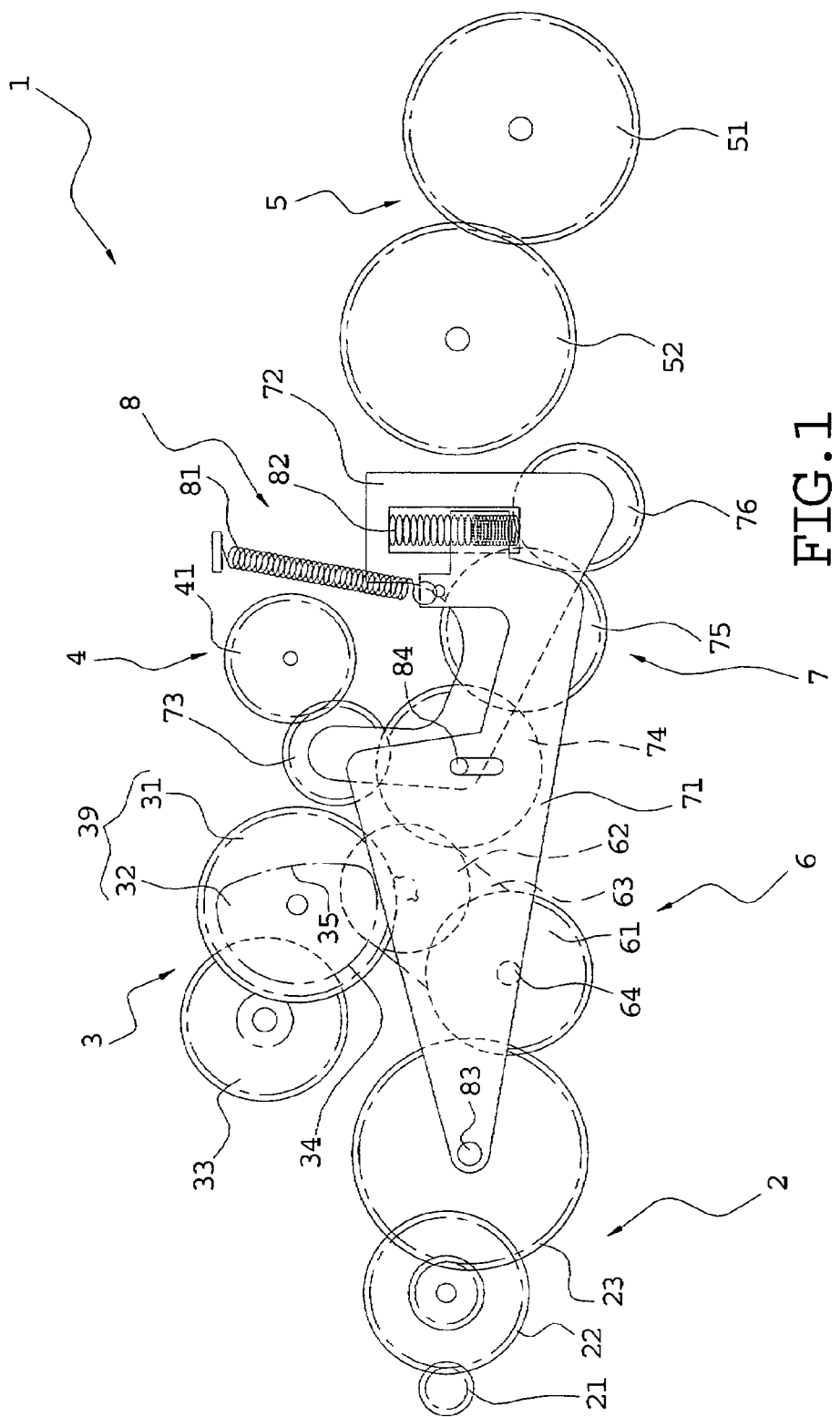
FIG. 1 is a schematic view of a control system according to the present invention.

Referring to FIG. 1, the present invention provides a control system 1 for driving a motor to perform a plurality of actions, comprising: a motor gear set 2, a first action gear set 3, a second action gear set 4, a third action gear set 5, a first switch gear set 6, and a second switch gear set 7.

The motor gear set 2 includes a motor gear 21, an idler 22, and an idler 23. The motor gear 21 engages with the idler 22, and the idler 22 engages with the idler 23. Moreover, the idlers 22, 23 are used to adjust the rotational speed of the control system 1, so that the control system 1 can omit the idlers 22, 23 or introduce other idlers into the control system 1. The motor gear 21 is driven to rotate via a motor (not shown). When the motor rotates clockwise, the motor gear set 2 produces a first operating mode. When the motor rotates anticlockwise, the motor gear set 2 produces a second operating mode. Hence, the first operating mode has a gear rotation direction opposite to that of the second operating mode.

Figure 3:
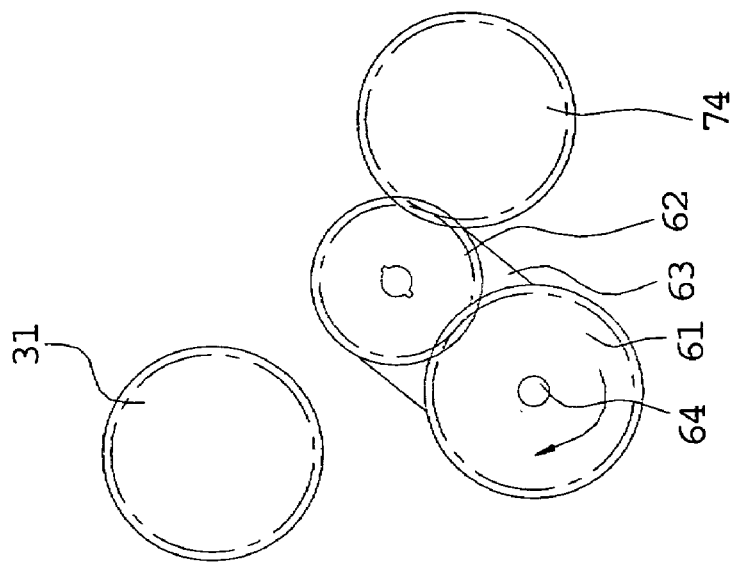
FIG. 3 is a schematic view of a control system in a second switch mode according to the present invention.
Figure 2:
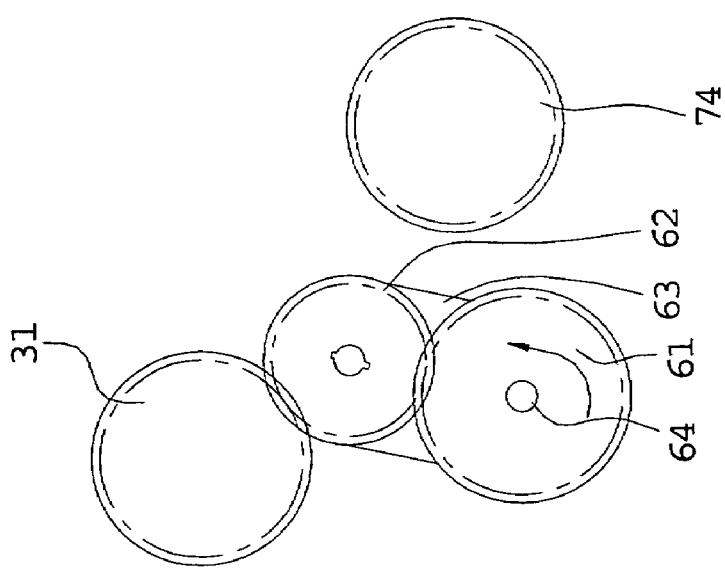
FIG. 2 is a schematic view of a control system in a first switch mode according to the present invention.

The first switch gear set 6 includes a first gear 61, a second gear 62, a first clutch lever 63, and a first fixing axle 64. The first gear 61 is disposed on one side of the first clutch lever 63, and the first gear 61 and the first clutch lever 63 are pivoted on the first fixing axle 64 together. The second gear 62 is disposed on the other side of the first clutch lever 63 for matching with the first gear 61. The first gear 61 is matched with the motor gear set 2 (in the present invention, the first gear 61 engages with the idler 23). Referring to FIG. 2, when the first gear 61 is driven to rotate anticlockwise via the first operating mode of the motor gear set 2, the second gear 62 is driven to rotate clockwise and the first clutch lever 63 is swung left via the first gear 61 for producing a first switch mode. Referring to FIG. 3, when the first gear 61 is driven to rotate clockwise via the second operating mode of the motor gear set 2, the second gear 62 is driven to rotate anticlockwise and the first clutch lever 63 is swung right via the first gear 61 to match the second switch gear set 7 for producing a second switch mode.

Figure 4:
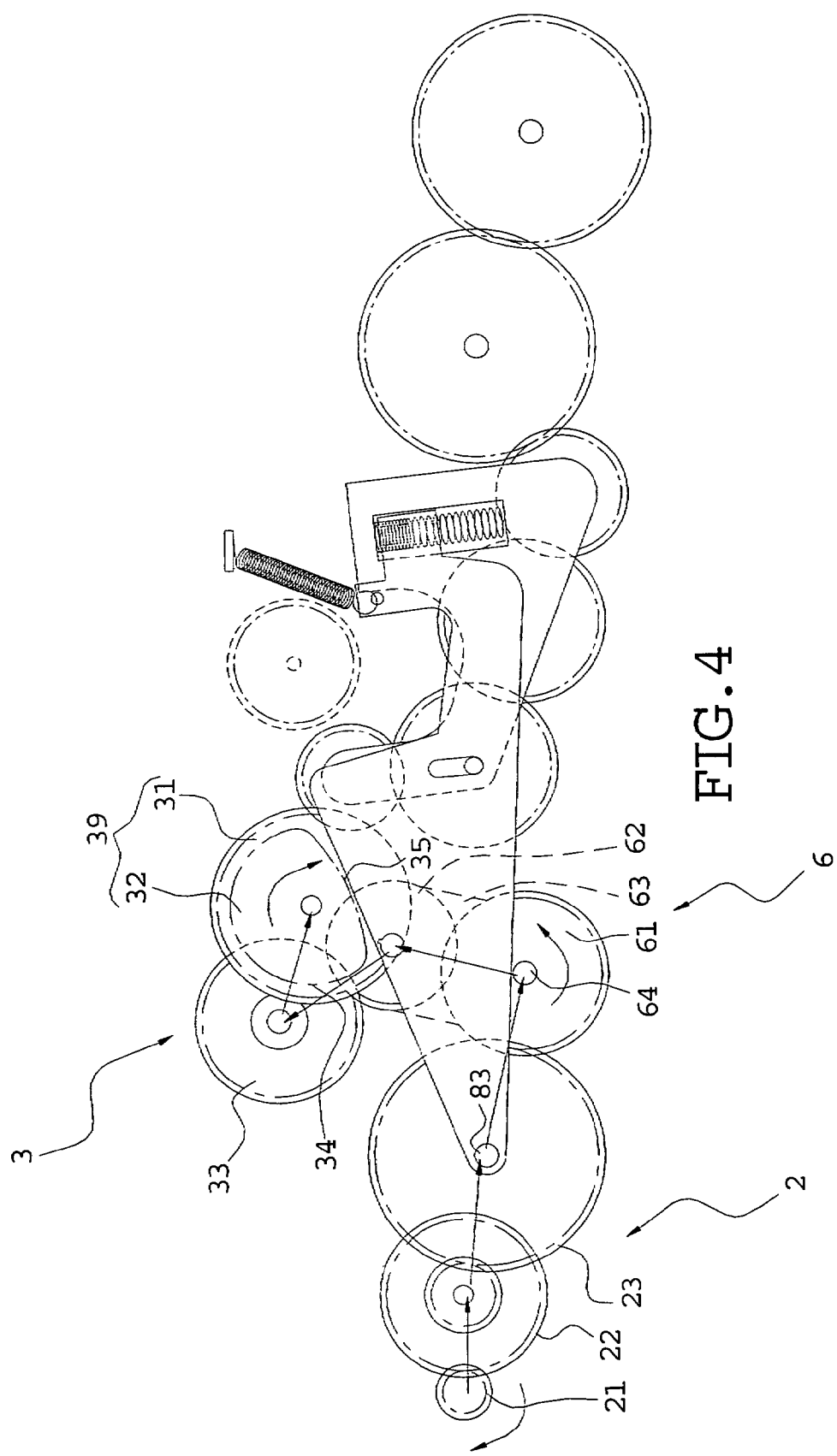
FIG. 4 is an operating schematic view of a control system of a first action gear set according to the present invention.

The first action gear set 3 includes a compound gear 39 and a fourth gear 33. The compound gear 39 includes a third gear 31 engaged with the fourth gear 33 and a cam 32 coaxially joined with the third gear 31. The cam 32 is disposed on the third gear 31. The cam 32 has a long radius surface 34 and a short radius surface 35. When the long radius surface 34 of the cam 32 is matched with the second switch gear set 7, the first action gear set 3 produces a raising mode. When the short radius surface 35 of the cam 32 is matched with the second switch gear set 7, the first action gear set 3 produces a downward pressing mode. Referring to FIG. 4, when the motor gear set 2 is in the first operating mode, the first switch gear set 6 is driven to switch into first switch mode for the first switch gear set 6 matching with the fourth gear 33 to drive the third gear 31 and the cam 33 to rotate (in another embodiment the fourth gear 33 can be omitted, so that the first switch gear set 6 can match the third gear 31 directly). In other words, the first action gear set 3 is driven to move via the rotation of the motor gear set 2.

The second switch gear set 7 includes a second clutch lever 71, a third clutch lever 72, a first spring 81, a second spring 82, a second fixing axle 83, and a third fixing axle 84. One side of the second clutch lever 71 is pivoted on the second fixing axle 83 and the other side of the second clutch lever 71 is jointed with the third clutch lever 72 via the second spring 82. One side of the first spring 81 is fixed, and the other side of the first spring 81 is jointed with an upper portion of the second clutch lever 71 for supplying an upward force (in the another embodiment the second clutch lever 71 and the third clutch lever 72 are directly jointed together without any springs). The second fixing axle 83 has an axle the same as that of the idler 23. Moreover, the third clutch lever 72 includes a seventh gear 73, a fifth gear 74, an idler 75 and a sixth gear 76. The third clutch lever 72 and the fifth gear 74 are pivoted on the third fixing axle 83. The seventh gear 73 is pivoted on one side of the third clutch lever 72 for engaging with the fifth gear 74. The idler 75 is pivoted on the third clutch lever 72 for engaging with the fifth gear 74. The sixth gear 76 is pivoted on the other side of the third clutch lever 72 for engaging with the idler 75. In another embodiment the idler 75 is used to adjust the rotational speed of the control system 1, so that the idler 75 can be omitted.

Figure 5:
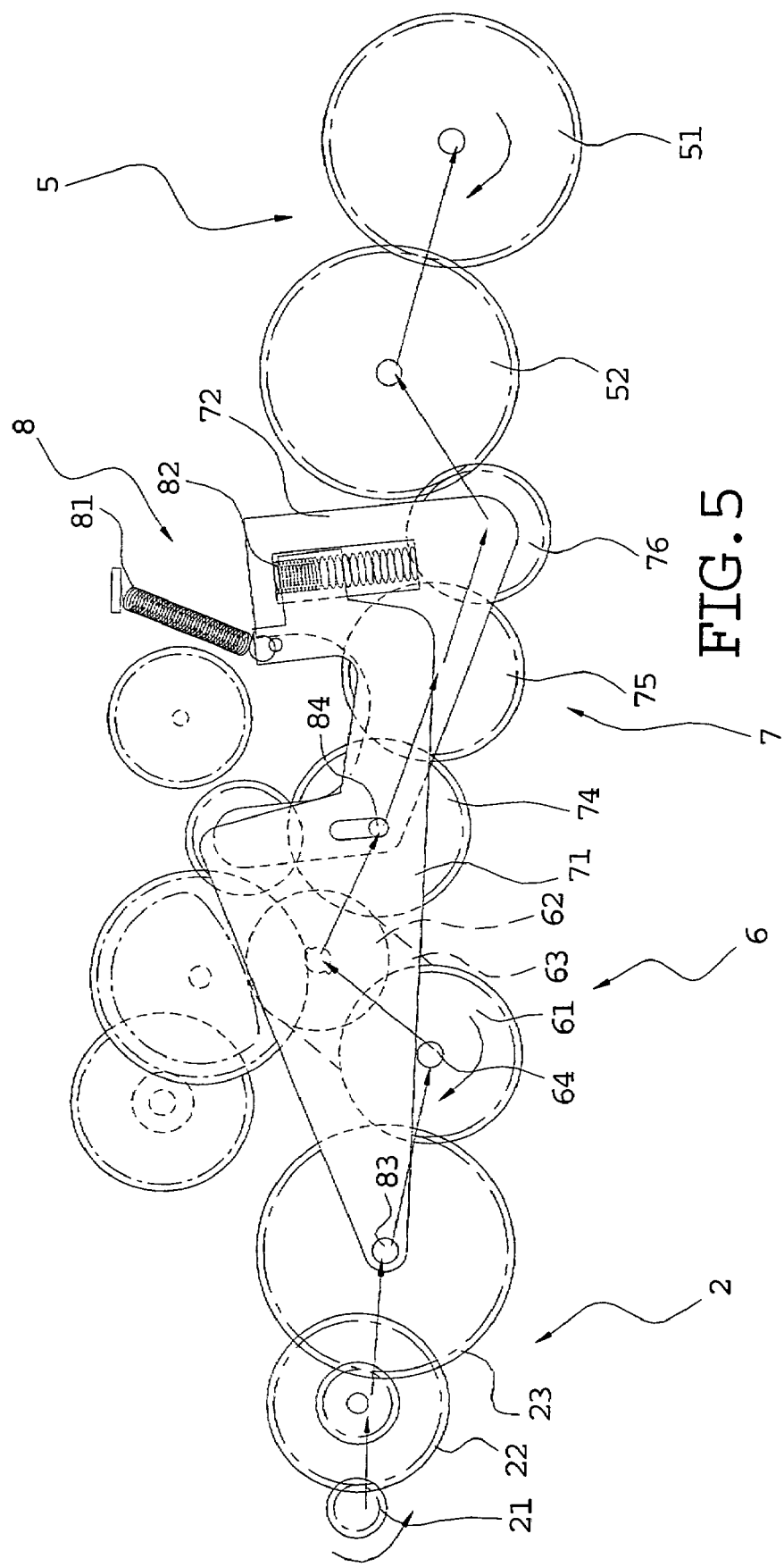
FIG. 5 is an operating schematic view of a control system of a third action gear set according to the present invention.

Referring to FIG. 5, the third action gear set 5 includes a ninth gear 51 and a tenth gear 52. The cam 32 of the first action gear set 3 is in the raised mode, the second clutch lever 71 contacts the short radius surface 35 of the cam 32 and the second clutch lever 71 is raised to pull the third clutch lever 72 for making the third clutch lever 72 rotate clockwise by the third fixing axle 84 as an axle center and making the sixth gear 76 engage with the tenth gear 52 (in another embodiment the tenth gear 52 can be omitted, so that the sixth gear 76 can be engaged with the ninth gear 51). In other words, the second switch gear set 7 matched with the third action gear set 5 is the third switch mode of the second switch gear set 7, and the third switch mode also means the third action gear set 5 is driven to rotate via the rotation of the motor gear set 2.

Figure 6:
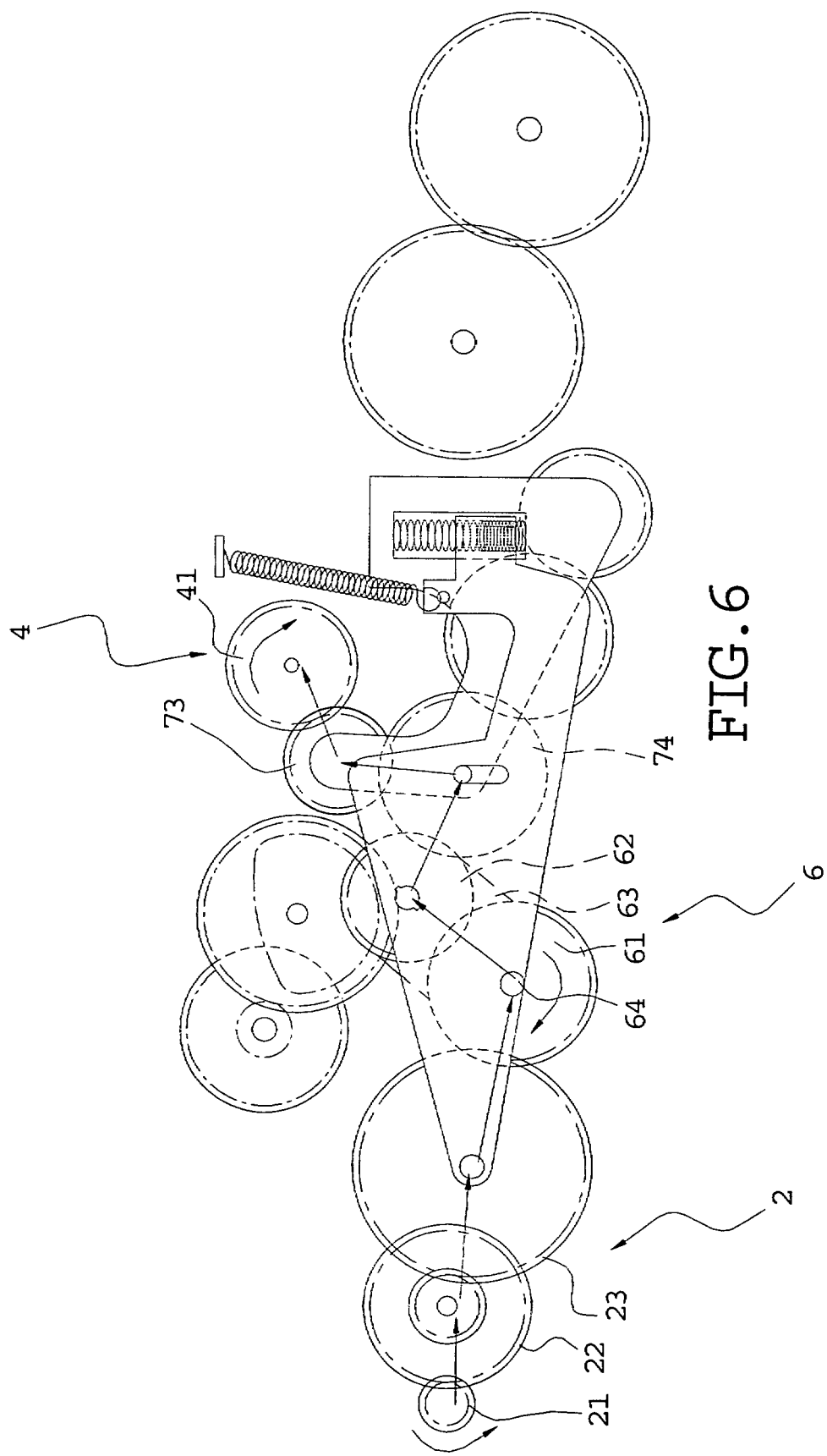
FIG. 6 is an operating schematic view of a control system of a second action gear set according to the present invention.

Referring to FIG. 6, the second action gear set 4 includes an eighth gear 41. In this embodiment the cam 32 of the first action gear set 3 is in the downward pressing mode, the second clutch lever 71 contacts the long radius surface 34 of the cam 32 and the second clutch lever 71 is pressed downward for making the third clutch lever 72 to rotate anticlockwise by the third fixing axle 84 as an axle center and making the seventh gear 73 engage with the eighth gear 41 (in another embodiment a idler can be set between the seventh gear 73 and the eighth gear 41, so that the seventh gear 73 is engaged with the idler and the idler is engaged with the eighth gear 41). In other words, the second switch gear set 7 matched with the second action gear set 4 is the fourth switch mode of the second switch gear set 7, and the fourth switch mode also means the second action gear set 4 is driven to rotate via the rotation of the motor gear set 2.

Figure 7:
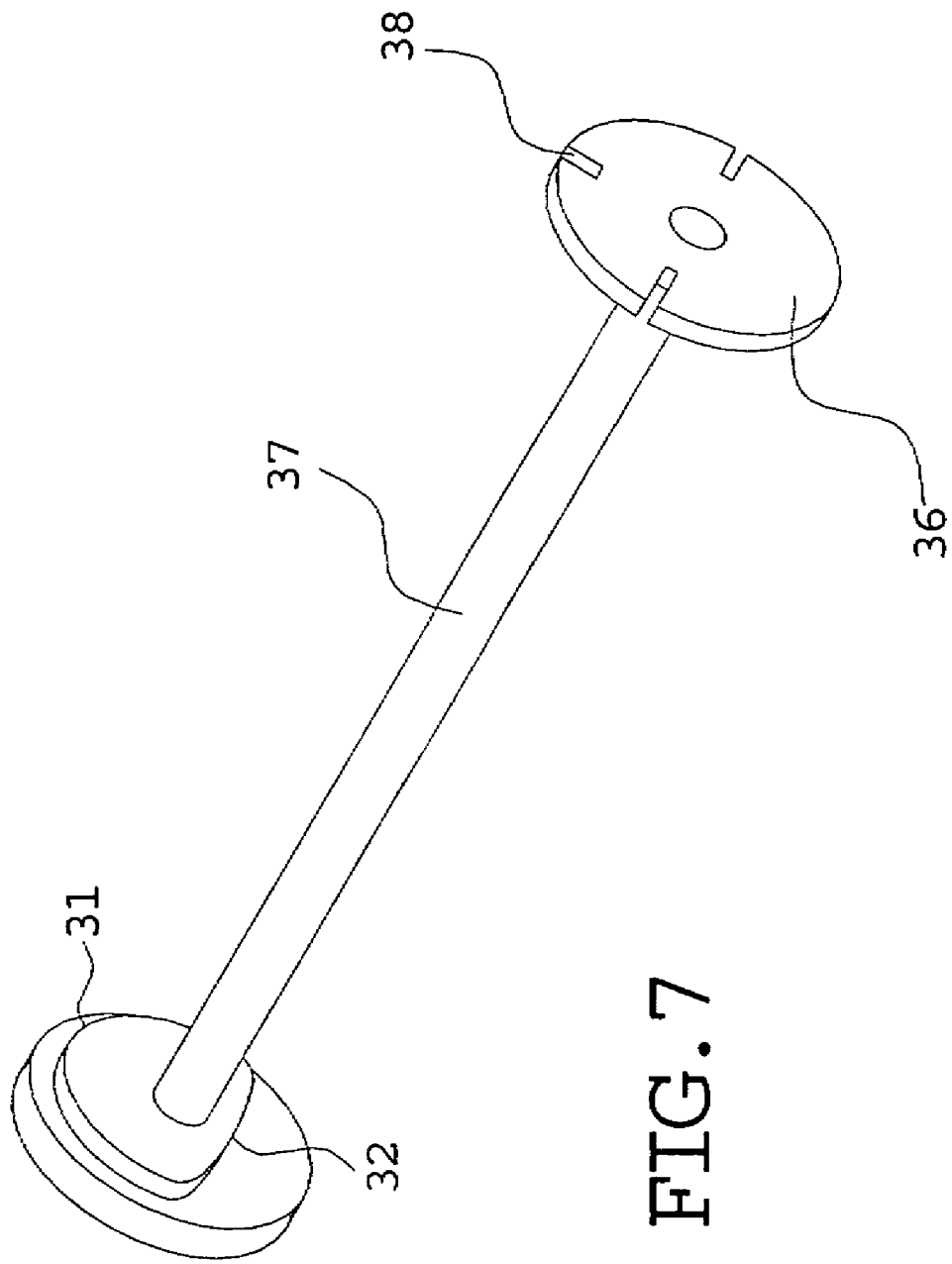
FIG. 7 is a perspective, schematic view of a control system of a detective cam according to the present invention.

Referring to FIG. 7, the control system 1 further comprises a detective cam 36 pivoted on an axle 37. Hence, the detective cam 36, the third gear 31 and the cam 32 share the axle 37. Moreover, the detective cam 36 includes a plurality of concave grooves 38. Hence, a position of the cam 32 will be known by looking a position of any one of the concave grooves 38.

Above-mentioned embodiment, the idlers can be increased or decreased according to designer's need for changing or adjusting the rotational speed of the control system 1.

Figure 8:
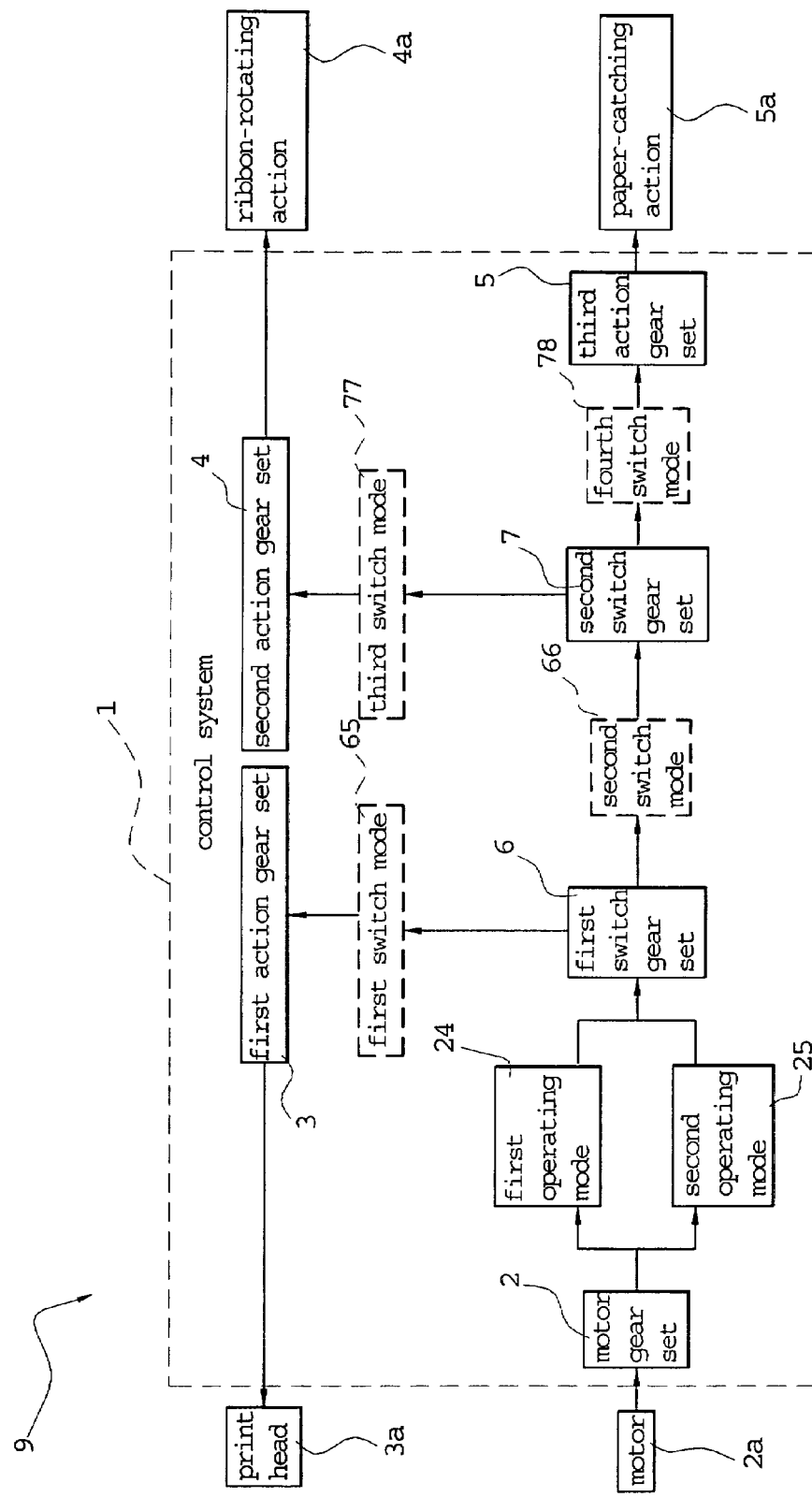
FIG. 8 is a function block of a control system adapted to a printer according to the present invention.

Referring to FIG. 8, the control system 1 of the present invention is adapted to a printer 9. First step, when the motor 2a is rotated clockwise to drive the motor gear set 2 to produce the first operating mode 24, the first switch gear set 6 produces the first switch mode 65 to drive the first action gear set 3 for a print head 3a circularly being in a print head raised position (the cam 32 is in the raised mode at the same time) or a print head downward pressing position (the cam 32 is in the downward pressing mode at the same time). Hence, when the print head 3a stops in the print head raised position, the cam 32 is in the raised mode at the same time. When the print head 3a stops in the downward pressing position, the cam 32 is in the downward pressing mode at the same time.

Second step, when the motor 2a is rotated anticlockwise to drive the motor gear set 2 to produce the second operating mode 25, the first switch gear set 6 produces the second switch mode 66 (the cam 32 is in the raised mode at the same time) to drive the fourth switch mode 78 of the second switch gear set 7 to make the third action gear set 5 rotate for the printer 9 producing a paper-catching action 5a.

Third step, the motor 2a is rotated clockwise to drive the motor gear set 2 to produce the first operating mode 24, and the print head 3a is in the print head raised position and the cam 32 is in the downward pressing mode at the same time.

Fourth step, the motor 2a is rotated anticlockwise to drive the motor gear set 2 to produce the second operating mode 25, and the second switch gear set 7 produces the third switch mode 77 to make the second action gear set 4 rotate for the printer 9 producing a ribbon-rotating action 4a that is a ribbon search function.

Fifth step, the motor 2a is rotated clockwise to drive the motor gear set 2 to produce the first operating mode 24, and the print head 3a is in the print downward pressing position and the cam 32 is in the downward pressing mode at the same time.

Sixth step, the motor 2a is rotated anticlockwise to drive the motor gear set 2 to produce the second operating mode 25, and the second switch gear set 7 produces the third switch mode 77 to make the second action gear set 4 rotate for the printer 9 producing a ribbon-rotating action 4a that is a ribbon search function.

Repeat above-mentioned steps 1-6 for the printer 9 to finish document print.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A control system for driving a motor to perform a plurality of actions, comprising:
   a motor gear set having a first operating mode and a second operating mode;
   a first switch gear set matched with the motor gear set, wherein the first switch gear set produces a first switch mode and a second switch mode via the first operating mode and the second operating mode, respectively;
   a first action gear set matched with the first switch gear set for rotation, wherein the first action gear set produces a raising mode and a downward pressing mode via the first operating mode of the motor gear set and the first switch mode of the first switch gear set, respectively;
   a second switch gear set matched with the first switch gear set, wherein when the first action gear set is in the raising mode, the second switch gear set produces a third switch mode via the second switch mode of the first switch gear set, and when the first action gear set is in the downward pressing mode, the second switch gear set produces a fourth switch mode via the second switch mode of the first switch gear set;
   a second action gear set matched with the second switch gear set, wherein the second action gear set produces a rotation mode via the third switch mode of the second switch gear set; and
   a third action gear set matched with the second switch gear set, wherein the third action gear set produces a rotation mode via the fourth switch mode of the second switch gear set.

2. The control system as claimed in claim 1, wherein the first operating mode has a gear rotation direction opposite to that of the second operating mode.

3. The control system as claimed in claim 1, wherein the motor gear set includes a motor gear and a plurality of idlers.

4. The control system as claimed in claim 1, further comprising a print head raised upwardly and pressing downwardly via the rotation of the first action gear set.

5. The control system as claimed in claim 1, wherein the first action gear set further comprises a detective cam with a plurality of concave grooves, and both the detective cam and the compound gear are pivoted on a common axle.

6. The control system as claimed in claim 1, wherein the second action gear set further comprise an eighth gear matched with a seventh gear.

7. The control system as claimed in claim 1, wherein the second action gear set further comprise an eighth gear and a plurality of idlers.

8. The control system as claimed in claim 1, wherein the rotation of the second action gear set produces a ribbon-rotating action.

9. The control system as claimed in claim 1, wherein the third action gear set further comprises a ninth gear matched with a sixth gear.

10. The control system as claimed in claim 1, wherein the third action gear set further comprises a tenth gear matched with a sixth gear and a ninth gear matched with a tenth gear.

11. The control system as claimed in claim 1, wherein the rotation of the mode. third action gear set produces a paper-catching action.

12. The control system as claimed in claim 1, wherein the first switch gear set includes a first clutch lever, a first gear, a second gear and a first fixing axle; wherein one side of the first clutch lever is pivoted on the first fixing axle, the first gear is disposed on the one side of the first clutch lever and pivoted on the first fixing axle, and the second gear is disposed on the other side of the first clutch lever for matching with the first gear; whereby when the first gear is driven to rotate via the motor gear set, the second gear is driven to rotate and the first clutch lever is swung right and left via the first gear.

13. The control system as claimed in claim 12, wherein the first switch mode of the first switch gear set means that the first gear drives the second gear to rotate clockwise and drives the first clutch lever to swing left, and the second switch mode of the first switch gear set means that the first gear drives the second gear to rotate counterclockwise and drives the first clutch lever to swing right.

14. The control system as claimed in claim 1, wherein the first action gear set includes a fourth gear matched with the second gear and a compound gear matched with the fourth gear, the compound gear includes a third gear matched with the fourth gear and a cam coaxially joined with the third gear, and the cam is disposed adjacent to the second switch gear set.

15. The control system as claimed in claim 14, wherein the cam has a long radius surface and a short radius surface.

16. The control system as claimed in claim 1, wherein the second switch gear set includes a second clutch lever, a third clutch lever, a fifth gear matched with the second gear, a sixth gear, a seventh gear, a second fixing axle and a third fixing axle; wherein one side of the second clutch lever is pivoted on the second fixing axle and the other side of the second clutch lever is jointed with the third clutch lever, a center portion of the third clutch lever is pivoted on the third fixing axle, the fifth gear is disposed on the third clutch lever and pivoted on the third fixing axle; wherein the seventh gear is pivoted on one side of the third clutch lever for matching with the fifth gear, and the sixth gear is pivoted on the other side of the third clutch lever for matching with the fifth gear; whereby when the first switch gear set is matched with the fifth gear, all the seventh gear, the fifth gear and the sixth gear are driven to rotate.

17. The control system as claimed in claim 16, further comprising a first spring jointed with the second clutch lever.

18. The control system as claimed in claim 16, further comprising a second spring jointed with both the second clutch lever and the third clutch lever.

19. The control system as claimed in claim 16, wherein the third switch mode of the second switch gear set occurs when the first action gear set is in downward pressing mode, and the second clutch lever is pressed downwardly to drive the third clutch lever to rotate clockwise; wherein the fourth switch mode of the second switch gear set occurs when the first action gear set is in the raised mode, and the second clutch lever is raised to drive the third clutch lever to rotate anti-clockwise.

* * * * *